United States Patent [19]

Iiyama

[11] Patent Number: 5,201,300
[45] Date of Patent: Apr. 13, 1993

[54] DIRECT INJECTION DIESEL ENGINE

[75] Inventor: Akihiro Iiyama, Yokohama, Japan

[73] Assignee: Nissan Motor Co., Ltd., Japan

[21] Appl. No.: 756,209

[22] Filed: Sep. 10, 1991

[30] Foreign Application Priority Data

Sep. 12, 1990 [JP] Japan ............................ 2-241513

[51] Int. Cl.$^5$ ...................... F02B 47/08; F02M 37/04
[52] U.S. Cl. ............................ 123/569; 123/508; 123/506
[58] Field of Search ............... 123/508, 507, 569, 571, 123/506, 467, 501, 299, 300

[56] References Cited

U.S. PATENT DOCUMENTS

| | | | |
|---|---|---|---|
| 4,141,329 | 2/1979 | Pompei | 123/508 |
| 4,187,825 | 2/1980 | Loyd | 123/299 |
| 4,467,767 | 8/1984 | Kampichler | 123/506 |
| 4,648,369 | 3/1987 | Wannenwetsch | 123/506 |
| 4,651,779 | 3/1987 | Filippi | 123/506 |
| 4,721,075 | 1/1988 | Kasai | 123/508 |
| 4,727,848 | 3/1988 | Stumpp | 123/569 |
| 4,836,170 | 6/1989 | Hafele | 123/501 |
| 4,836,171 | 6/1989 | Melde-Tuczai | 123/508 |
| 5,115,789 | 5/1992 | Aoyama | 123/569 |

FOREIGN PATENT DOCUMENTS 61-160271 10/1986 Japan.
61-162572 10/1986 Japan.

Primary Examiner—Carl S. Miller
Attorney, Agent, or Firm—Lowe, Price, LeBlanc & Becker

[57] ABSTRACT

In a diesel engine having a combustion chamber formed by a cylinder and piston where fuel is injected into the chamber directly, and provided with a device whereby part of the exhaust gas is recycled into the air intake depending on the running condition of the engine, a fuel injection valve is fitted to the head of the cylinder parallel to or coaxial with the cylinder axis and near the center of the combustion chamber. The valve lifts in two stages according to the fuel pressure so as to spray fuel evenly into the chamber and thus promote mixing of fuel with air. Fuel injection pressure is increased by a fuel pump which supplies high pressure fuel to the injection valve in synchronization with the engine revolution, and the residual pressure in the pipe which leads fuel from the fuel injection pump to the fuel injection valve is kept approximately constant by a pressure equalizing valve so as to avoid a secondary fuel injection. As a result, combustion is improved when exhaust gas is recirculated, and the emission of both NOx and smoke is reduced.

24 Claims, 6 Drawing Sheets

DIRECT INJECTION DIESEL ENGINE

FIELD OF THE INVENTION

This invention relates to a direct injection diesel engine provided with an exhaust gas recirculation system, and more particularly, concerns a method of reducing emission of NOx and smoke when exhaust gas is recycled.

BACKGROUND OF THE INVENTION

Exhaust gas recirculation (referred to hereafter as EGR), wherein part of the exhaust gas from an engine is recycled in the air intake to reduce peak temperature and pressure in the combustion chamber, is a recognized means of reducing emission of NOx in the exhaust from direct injection diesel engines.

Although such EGR systems do reduce the amount of NOx generated, they also have the disadvantage that generation of smoke (particulate matter) tends to increase, since the recirculation of exhaust gas effectively reduces the oxygen concentration in the combustion chamber.

This smoke generation largely depends on the state of fuel injected from the fuel injection valve.

The fuel injection valves of diesel engines are generally fitted to the cylinder head at an inclined angle to avoid interference with air intake or exhaust valves. This however leads to uneven fuel injection inside the chamber so that air is used less efficiently where there is a high concentration of fuel, and more smoke is generated when exhaust gas is recycled.

In this context, a two stage fuel injection valve for diesel engines is proposed in, for example, Jikkaisho No. 61-160271 and No. 61-162572 published by the Japanese Patent Office.

In this valve, a small amount of fuel is injected in an initial lift, and after this initial amount of fuel has ignited, a larger amount of fuel is injected in a second lift. This system was intended to reduce the ignition delay in the main fuel injection, help the combustion flame to spread evenly and rapidly throughout the chamber, reduce combustion noise and emission of NOx, and generate less smoke.

However, as the fuel injection valve is fitted to the cylinder head at an inclined angle, fuel injection still tended to be uneven and led to generation of smoke when exhaust gas was recycled.

In this two stage valve, to further reduce combustion noise and emission of NOx, it has been proposed to reduce the initial lift and amount of fuel in the initial injection as far as possible.

To reduce the initial lift, the fuel flow path is made narrower. This however causes the pressure of fuel injected in the initial lift to fall, and as it is then difficult to convert the fuel to fine droplets, more smoke is again generated.

If the pressure of fuel supplied to the injection valve is increased proportionately to offset the narrowing of the fuel path, conversion of the fuel to fine droplets is improved, but it also tends to give rise to a secondary injection due to a pressure reflection wave after fuel injection is complete. This pressure reflection wave is formed in such a manner that a pressure wave generated at the fuel injection valve when it is closed is transmitted upstream and reflected at the fuel injection pump. The reflected wave is transmitted back to the fuel injection valve and pushes the valve open. In two stage valves, in particular, the pressure at which the valve opened in the initial lift (initial injection) was low, and a secondary injection therefore occurred easily when a pressure reflection wave is acting.

This secondary injection of fuel delays completion of combustion, and increases emission of unburnt components in the exhaust. It also leads to excessive fuel consumption, and severely impairs drivability and fuel cost performance of the vehicle.

Thus, even if an EGR system is combined with a two stage fuel injection valve and emission of NOx is decreased, smoke generation increases. It was therefore difficult to reduce both NOx and smoke simultaneously.

SUMMARY OF THE INVENTION

Therefore it is an object of this invention to improve admixture of fuel and air in the combustion chamber of direct injection diesel engines, and thereby to reduce generation of smoke when exhaust gas is recycled.

Another object of this invention is to allow a small initial fuel injection under high pressure in such engines so as to promote conversion of the fuel to fine droplets and reduce generation of NOx and smoke simultaneously without the risk of secondary injection through the fuel injection valve.

To achieve these objects, this invention provides a diesel engine with a combustion chamber formed by a cylinder and piston where fuel is injected into the chamber directly, comprising a means for recycling part of the exhaust gas into the air intake depending on the running condition of the engine, a fuel injection valve fitted to the head of said cylinder parallel to or coaxial with the cylinder axis and facing the center of said chamber which lifts in two stages depending on the fuel pressure, a fuel injection pump which supplies high pressure fuel to said injection valve in synchronization with the engine revolution, and a pressure equalizing valve which maintains the residual pressure in the fuel pipe leading from said fuel injection pump to the fuel injection valve, approximately constant.

DESCRIPTION OF THE PREFERRED EMBODIMENTS

Figure 1:
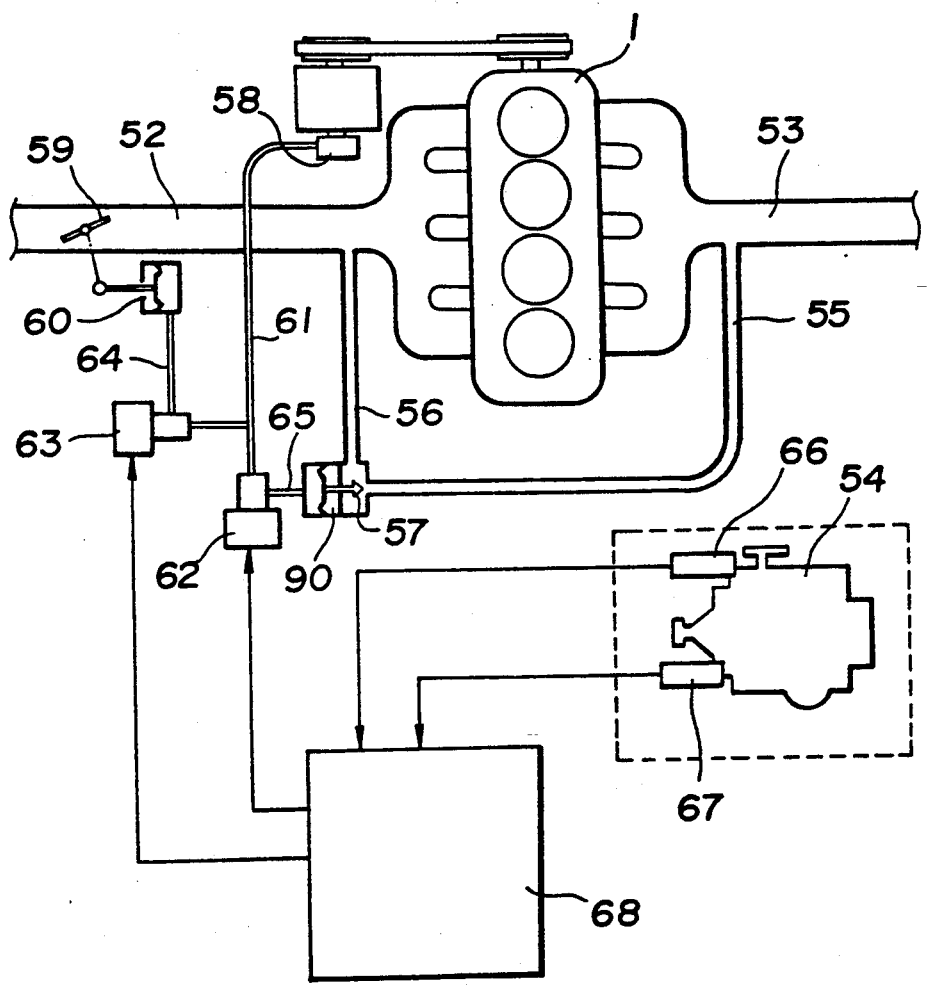
FIG. 1 is a schematic diagram showing a basic structure of a direct injection diesel engine according to this invention.

In FIG. 1, 1 is a direct injection diesel engine, 52 is an air intake manifold for leading air into the engine, 53 is an exhaust manifold for expelling exhaust gases, and 54 is a fuel injection pump for supplying fuel.

The air intake manifold 52 and the exhaust manifold 53 are connected together via exhaust gas recirculation passages (hereafter referred to as EGR passages) 55 and 56, and an exhaust gas recirculation valve (referred to hereafter as an EGR valve) 57 is provided between these EGR passages 55 and 56. Opening and closing of the EGR valve 57 is controlled by a diaphragm 90 acting as a negative pressure actuator.

A throttle valve 59 which is driven by a diaphragm 60 acting as a negative pressure actuator, is also provided upstream of the confluence of the air intake manifold 52 and ERG passage 56.

When said EGR valve 57 opens, exhaust gas is recycled, and the amount of gas recycled is increased by reducing the aperture of the throttle valve 59.

The diaphragm 90 acts under a negative pressure transmitted from a vacuum pump 58 driven by the engine 1 via a negative pressure passage 61, negative pressure control valve 62 and negative pressure passage 65.

The diaphragm 60 acts under a negative pressure from the negative pressure passage 61 via a negative pressure control valve 63 and negative pressure passage 64.

The pressure control valves 62 and 63 are connected to signal circuits of an electronic control unit 68, and control the negative pressures delivered to the diaphragms 90 and 60 respectively according to output signals from this control unit.

The fuel injection pump 54 is equipped with a lever aperture sensor 66, which detects the aperture of a pump lever not shown that controls the amount of fuel injected (engine load) concurrently with an accelerator pedal not shown, and an engine speed sensor 67 that detects engine speed. These sensors are both connected to the control unit 68 via signal circuits.

Based on input signals from the sensors 66 and 67, and on a previously determined EGR control map, the control unit 68 computes pressure control values and outputs them to the valves 62 and 63. In this manner, the amount of exhaust gas recycled is controlled according to the EGR chart, a large amount of exhaust gas is recycled at least when the engine is running on partial load, and the emission of NOx is reduced.

Figure 2:
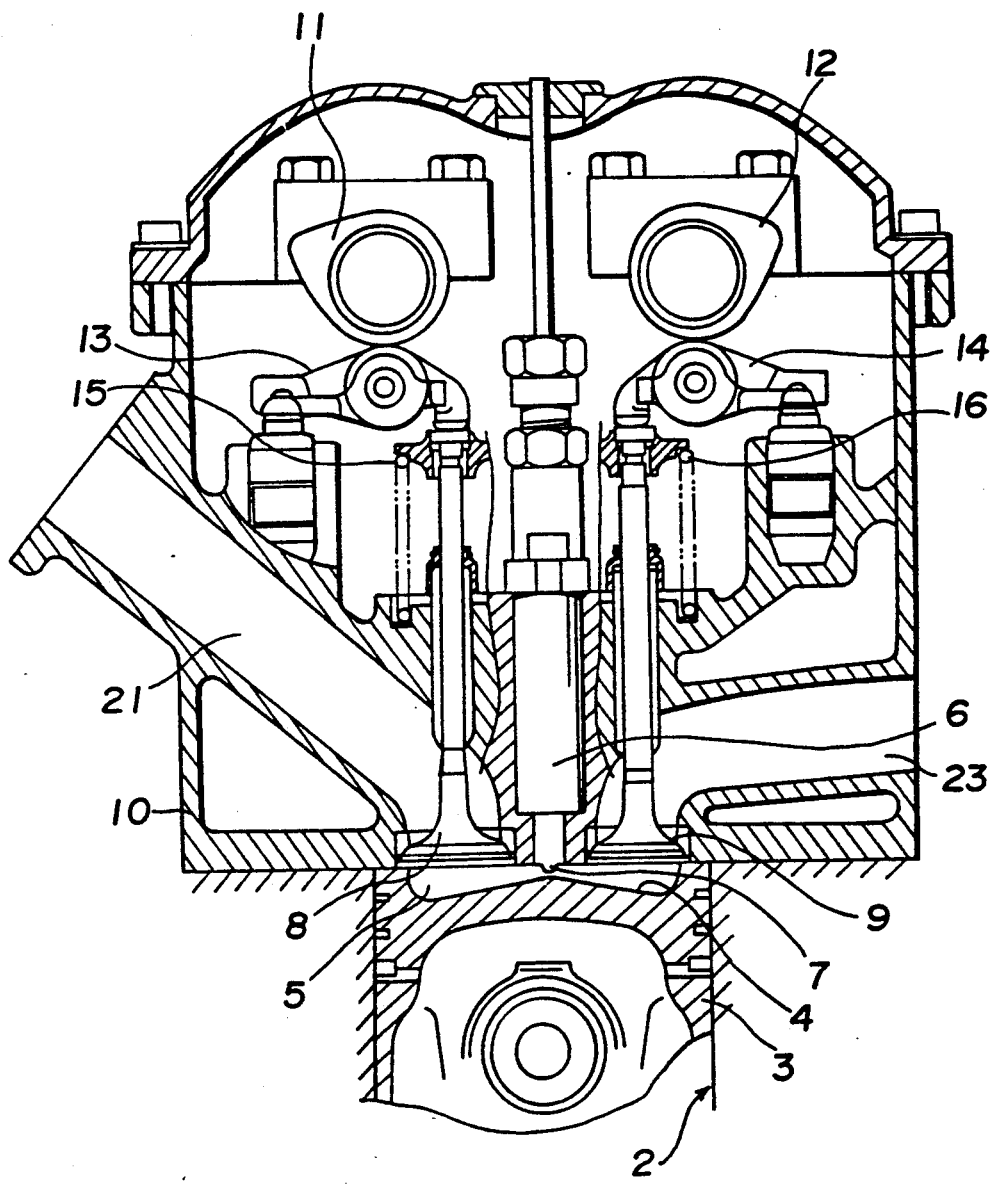
FIG. 2 shows a vertical section through an upper part of the direct injection diesel engine according to this invention taken along the center line of a cylinder.

FIG. 2 shows the construction of the cylinder head 10 and upper part of the cylinder 2 in this diesel engine. A piston 3 is fitted such that it is free to slide in the cylinder 2, and a cavity 4 on the top of piston 3 forms a combustion chamber 5 in cylinder 2.

A fuel injection valve 6 is provided in the center of cylinder head 10. This valve 6 is disposed parallel to the center axis of the cylinder 2, and a fuel injection nozzle 7 at its tip is situated close to the center of the combustion chamber 5.

Two air intake valves 8 and two exhaust valves 9, of which only one of each is shown in FIG. 2, are also disposed around the nozzle 7 in combustion chamber 5. These valves 8 and 9 are arranged parallel to the center axis of the cylinder 2.

Air intake ports 21 connected to the valves 8, and exhaust ports 23 connected to the valves 9, are also provided in the cylinder head 10.

The valves 8 and 9 are driven in opposition to valve springs 15 and 16 by rocker arms 13 and 14 supported such that they are free to oscillate in the cylinder head 10. Air intake cams 11 and exhaust cams 12 which rotate synchronously with the revolution of the engine are also provided in the upper part of the cylinder head 10. It should be noted that FIG. 2 illustrates only one each of the cams 11 and 12. These cams 11 and 12 open and close the valves 8 and 9 with a specified timing in synchronization with the engine by pressing the arms 13 and 14 down against the force of the valve springs 15 and 16.

Figure 3:
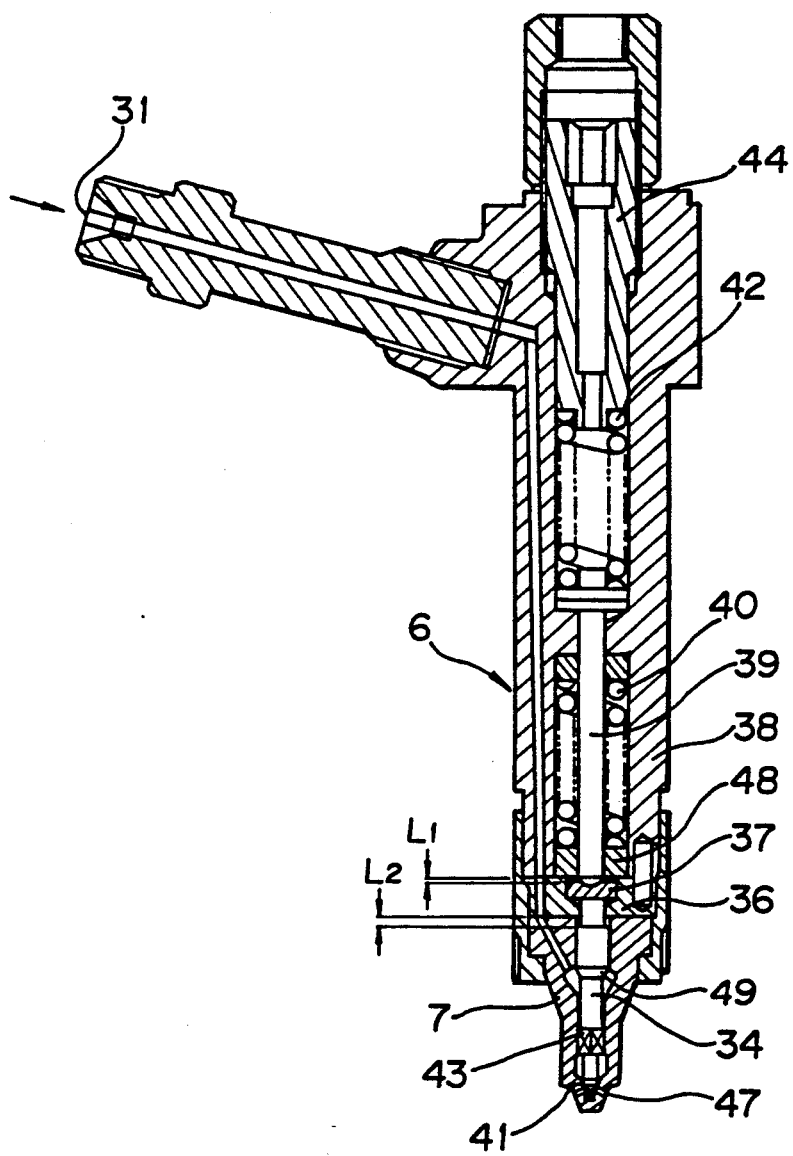
FIG. 3 shows a vertical section through a fuel injection valve according to this invention taken along its center line.

FIG. 3 shows the structure of the fuel injection valve 6.

Figure 7:
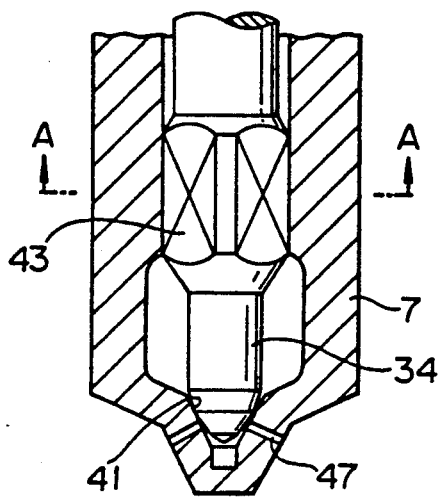
FIG. 7 is an enlarged view of the fuel injection nozzle in FIG. 3.
Figure 9:
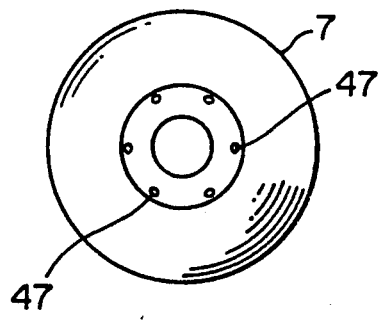
FIG. 9 is a front elevation of the fuel injection nozzle.
Figure 10:
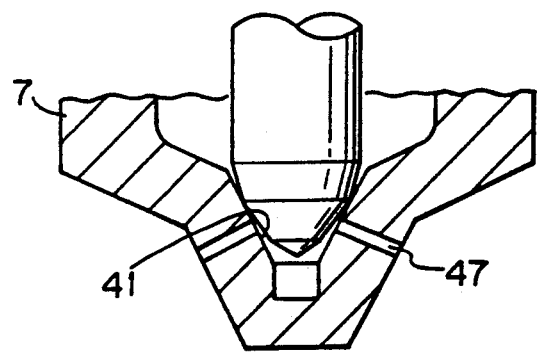
FIG. 10 is an enlarged view of a part of FIG. 7.

This valve 6 is provided with a seat 41 formed at the tip of the nozzle 7, a needle valve 34 seated in the seat 41 as shown in FIGS. 7 and 10. A plurality of spray holes 47 as shown in FIG. 9 is formed in the seat 41 facing combustion chamber 5. These spray holes 47 open when the needle valve 34 lifts away from the seat 41, and spray fuel supplied from a fuel inlet 31 into the combustion chamber 5.

The spray holes 47, which are of equal surface area, are arranged radially in seat 41, spaced at equal intervals apart, and inclined at equal angles to the nozzle axis.

Fuel injected from near the center of the combustion chamber 5 is thus dispersed evenly throughout the chamber, its concentration is distributed evenly in the chamber, it mixes with air more effectively, and air is utilized more efficiently in the combustion.

The needle valve 34 is supported by a first return spring 42 via a shim 37 housed in a nozzle holder 38 which holds the nozzle 7, and via a push rod 39. This valve 34 is provided with an outer skirt 49 of large diameter adjacent to a small chamber into which fuel is led from the inlet 31, and it moves upwards in an axial direction depending on the fuel pressure acting on the skirt 49. 36 is a stopper which adjusts the full lift of the valve 34, and 44 is a set screw which sets the spring load of the first return spring 42.

A spring seat 48 supported by a second return spring 40 is provided above the shim 37.

The valve 34 is first lifted by the fuel pressure acting upon the skirt 49 until the shim 37 touches the spring seat 48 while compressing the first return spring 42, and an initial fuel injection takes place through the spray holes 47 for the duration of this initial lift $L_1$. This initial lift $L_1$ is set at 10–40 $\mu$m for the purpose of reducing emission of NOx.

When the fuel pressure rises so that it exceeds the set load of the second return spring 40, the value 34 begins to lift again while compressing the second return spring 40 via spring seat 48 in addition to the first return spring 42. The valve 34 continues to lift until it touches the stopper 36, and fuel is injected at high pressure through the spray holes 47 for the duration of this full lift $L_2$.

The needle valve 34 therefore lifts in two stages. Initially, a small amount of fuel is injected, and a larger amount is then injected in a main injection. The effect of this is that, once the initial amount of fuel has ignited, the larger amount of fuel injected in the main injection can be burnt smoothly.

Figure 8:
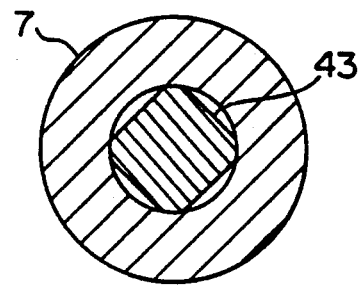
FIG. 8 is a cross sectional view of the fuel injection nozzle taken along the line A—A of FIG. 7.

A guide member 43 which slides in contact with the nozzle 7 is provided on the valve 34. As shown in FIG. 8, this guide member 43 has passages which allow fuel flow vertically up or down. Due to this guide member 43, the valve 34 moves concentrically with respect to the nozzle 7, the cross-section of the annular flow path produced between the valve 34 and seat 41 due to the lift of the valve is maintained uniform, and fuel is injected into the combustion chamber 5 more uniformly.

Figure 4:
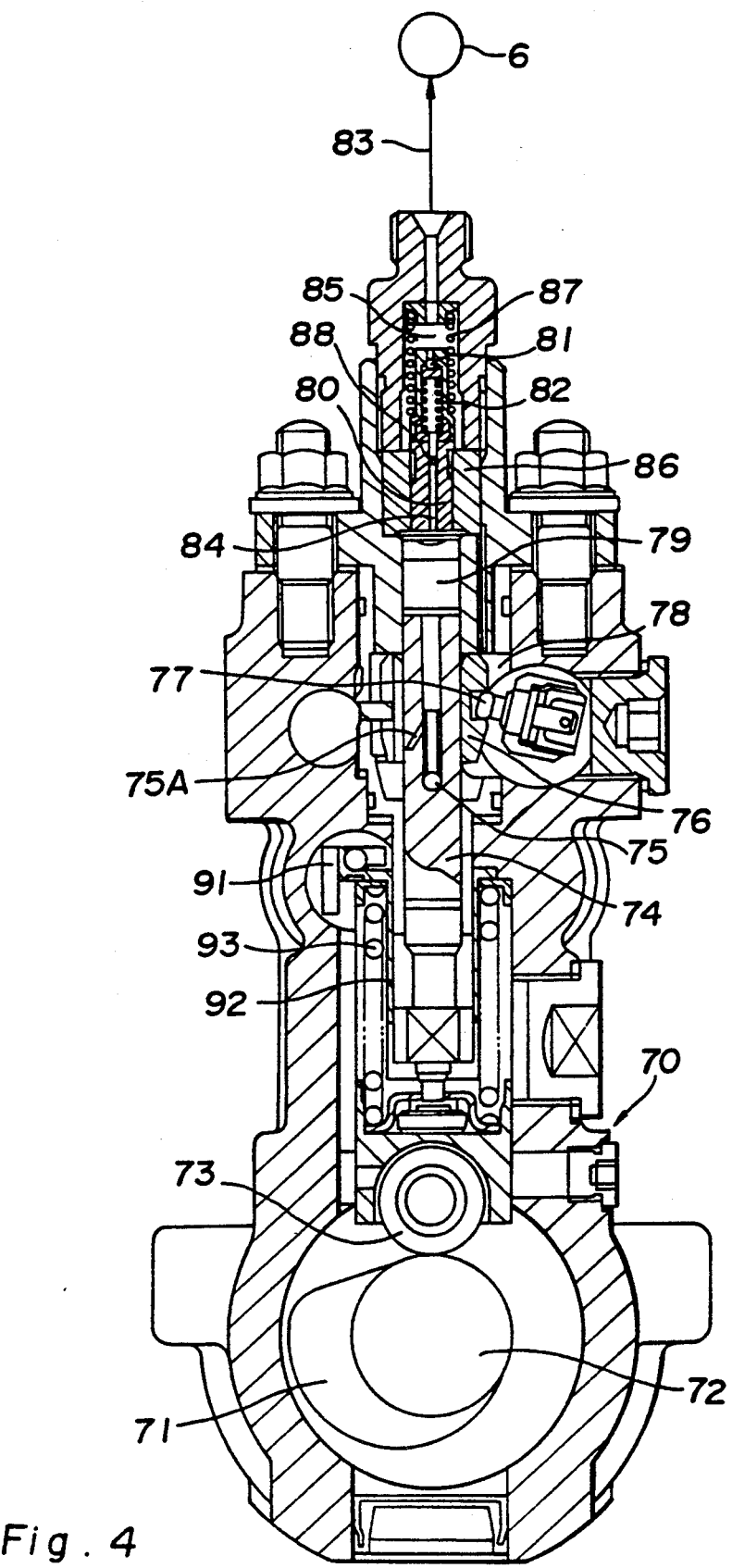
FIG. 4 shows a vertical section through a fuel injection pump according to this invention taken along its center line.

FIG. 4 shows the fuel injection pump 70. A cam 71 is rotated by a cam shaft 72 connected directly to the engine crank shaft not shown, and pushes a plunger 74 up via a roller 73. A return spring 93 is provided to return the plunger 74 to its original position.

A fuel supply passage 75 is formed in the plunger 74. One end of this passage 75 opens on to a fuel supply chamber 78 which surrounds plunger 74, and the other end is connected to a high pressure chamber 79 above plunger 74.

A control sleeve 76 grips the outer surface of the plunger 74 such that the plunger is free to slide. As plunger 74 rises, this control sleeve 76 obstructs the connection to the fuel supply chamber 78 by closing the fuel supply passage 75 which opens onto the side of the plunger. The plunger 74 therefore begins to pressurize fuel in the high pressure chamber 79.

The sleeve 76 is provided with a spill port not shown which is connected to the chamber 78. When a groove 75A which connects with the fuel supply passage 75 of rising plunger 74 reaches this spill port, the pressure in the chamber 79 is released to the chamber 78, and fuel pressurization is complete.

The groove 75A is formed at an inclination to the outer circumference of the plunger 74. By rotating plunger 74 on the inner circumference of the sleeve 76, the plunger stroke up to the time when the spill port is connected to the groove 75A, and thus the amount of fuel injected, can be varied.

The construction is such that, when a sleeve 92 is rotated by a rack 91 which moves parallel to said cam axis 72, the plunger 74 also rotates. The rotational setting of plunger 74 can thus be controlled. The position of the rack 91 is controlled by a drive mechanism not shown depending on the degree of depression of the accelerator pedal.

The position of the sleeve 76 with respect to the axis of plunger 74 is controlled by a sleeve drive cam 77. When the sleeve 76 moves upwards fuel feed from the fuel injection pump 70 to the fuel injection valve 6 is delayed, pressurization of fuel occurs while the plunger 74 is being lifted rapidly by cam 71, and the injection pressure is higher. On the other hand, when the sleeve 76 moves downwards the fuel feed occurs earlier, pressurization occurs while the plunger 74 is still being lifted slowly by cam 71, and the injection pressure is consequently lower.

On partial load, the fuel feed is delayed and a fuel supply rate, which is an amount of fuel supplied for each lift of the plunger, is increased, while on full load, the fuel feed occurs earlier and the fuel supply rate is reduced. This has the effect of maintaining the injection pressure on partial load, and preventing excessive rise of injection pressure on full load.

A delivery valve 80 is also provided adjacent to the chamber 79. This valve 80 has a passage 84 permanently connected to the chamber 79, and a transverse passage 88 connected to the passage 84 and open to the outside of the valve 80. When the pressure in the chamber 79 is low, the valve 80 is pushed down by a spring 87, the transverse passage 88 is closed by a sleeve 86 which slides on the outer circumference of the valve, and the connection to a fuel outlet chamber 85 situated above the high pressure chamber 79 is shut off.

When the pressure in the chamber 79 increases, the delivery valve 80 moves upwards against the force of the spring 87, the passage 88 is exposed to the chamber 85 above sleeve 86, and the chamber 79 is thereby connected to chamber 85 via the passage 84.

A pressure equalizing valve 81 is also inserted between the chamber 85 and passage 84 such that it functions in parallel with the delivery valve 80. This valve 81 is fitted on the upper part of the valve 80, and is supported by a pressure setting spring 82.

After injection of fuel, when the residual pressure in a pipe 83 leading from the valve 81 to fuel injection valve 6 rises above the set pressure of the spring 82, valve 81 opens, part of the fuel flows back from the chamber 85 to fuel supply chamber 78 via the passage 84, the residual pressure in pipe 83 is maintained constant, and secondary injection of fuel through the nozzle 7 is prevented. The set pressure of the valve 81 is arranged to be lower than the initial injection pressure of the fuel injection valve 6.

Due to the action of this valve 81, the pressure of the pump 70 can be increased depending on the position setting of the sleeve 76 without any risk of secondary injection taking place. The initial injection pressure of fuel injection valve 6 can thus be increased, and fuel which is injected initially can be converted to fine droplets more efficiently.

If the fuel supply rate is increaseed, the amount of fuel injected in unit time increases. As described above, however, the amount of fuel initially injected can be limited by setting the lift in the initial injection, $L_1$, to 10–40 $\mu$m instead of to 60 $\mu$m as in the prior art.

When a large amount of fuel is injected into combustion chamber 5 the time delay until ignition is longer, but the subsequent combustion takes place rapidly, emission of NOx increases and combustion noise increases.

By reducing the amount of fuel initially injected, the time delay until ignition is shorter, the ignition is stablized and the combustion flame is propagated more smoothly. This initial combustion therefore has the effect of reducing NOx. When a larger amount of fuel is subsequently supplied in the main injection, the flame propagates rapidly around the fuel which has already ignited, and a stable main combustion is obtained.

Figure 5:
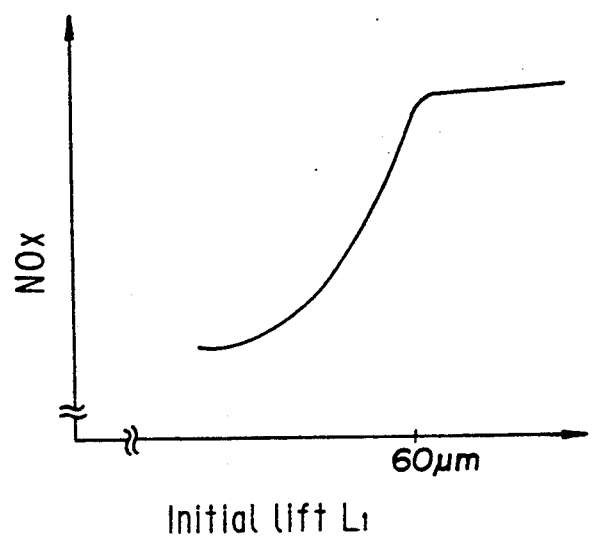
FIG. 5 is a graph showing the relation between the initial lift of the fuel injection valve and generation of NOx in the direct injection diesel engine according to this invention.

FIG. 5 shows the relation between initial lift and the the amount of NOx generated. As described above, if the initial lift is set in the range 10–40 $\mu$m, the amount of NOx generated can be reduced.

It has been described that if part of the exhaust gas is recycled especially when the engine is running on partial load, the generation of NOx is reduced proportionately. If in addition the amount of fuel initially injected by the valve 6 is made small, the two factors combine together to reduce the generation of NOx well below that in the prior art.

If exhaust gas is recycled in order to reduce NOx, the oxygen concentration in the combustion chamber falls, less air is available for combustion and smoke tends to be generated easily. In such a case, if the fuel density happens to rise due to an unevenness of fuel spray from the valve 6, or if the conversion of fuel to fine droplets is poor, fuel does not mix well with air and the amount of smoke (particulate matter ) which is generated increases rapidly.

In the present invention, however, the valve 6 is situated effectively in the center of the combustion chamber 5, and is set parallel to the cylinder axis. The spray holes 47, which are disposed uniformly around the tip of the nozzle 7, therefore spray fuel evenly into the chamber and make the fuel distribution density uniform.

Further, the initial lift of the valve 6 is set low as described. However, by increasing fuel supply pressure from pump 70, the initial injection pressure from the nozzle 7 can be increased and conversion of fuel to fine droplets can be effectively promoted.

Moreover, the guide 43 which guides the lift of needle valve 34 keeps the annular space between the valve 34 and seat 41 uniform. The fuel injection pressure is thus maintained substantially uniform over all the spray holes 47, and all the fuel sprayed into the combustion chamber 5 is converted to fine droplets satisfactorily.

The net result is that the fuel injected into the chamber 5 is dispersed uniformly and is well mixed with air. Even if a large amount of exhaust gas is recycled on partial load, therefore, the generation of smoke is effectively suppressed.

Figure 6:
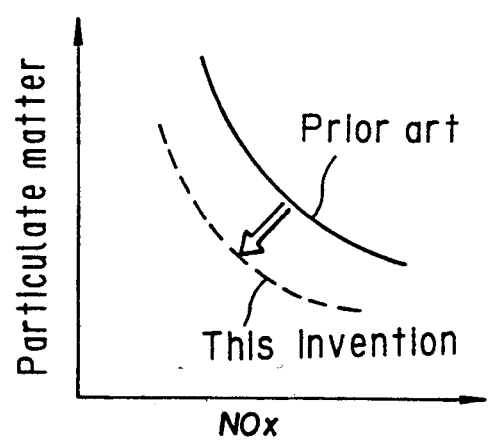
FIG. 6 is a graph showing the relation between generation of particulate matter and NOx in the direct injection diesel engine according to this invention.

By means of this invention, therefore, the amount of NOx and particulate matter is greatly reduced compared to conventional engines where there is considerable unevenness of fuel spray injection, as is evident from FIG. 6.

Moreover as described above, even if the fuel injection pressure is considerably increased, the valve 81 acts so as to suck residual fuel back and maintain the post-injection pressure constant. This effectively prevents any secondary fuel injection which would lead to poorer combustion and waste of fuel, hence drivability of the vehicle and fuel comsumption performance are also improved.

The foregoing description of a preferred embodiment for the purpose of illustrating this invention is not to be considered as limiting or restricting the invention, since many modifications may be made by those skilled in the art without departing from the scope of the invention.

The embodiments of the invention in which an exclusive property or privilege is claimed are defined as follows:

1. A diesel engine having a combustion chamber formed by a cylinder and a piston and into which fuel is directly injected, comprising:
   a device for recirculating at least a part of the exhaust gas into the air intake depending on the operating condition of the engine,
   a fuel injection valve fitted to a cylinder head of said cylinder substantially parallel to or coaxial with the cylinder axis and facing the center of said combustion chamber, said injection valve lifting in two stages, depending on the fuel pressure, to inject fuel into the chamber,
   a fuel injection pump which supplies high pressure fuel to said fuel injection valve in synchronization with the engine, said fuel injection pump having a plunger driven by a cam in synchronization with the engine revolution for pressurizing fuel, a control sleeve sliding on an outer surface of said plunger along the axis of said plunger to advance or delay the time at which fuel is supplied to the engine, and a sleeve drive cam to drive said control sleeve relative to said plunger so as to delay the time at which fuel begins to be supplied and increase the fuel supply rate when the engine is running on partial load, and
   a pressure equalizing valve which maintains the residual fuel pressure in a pipe which leads fuel from said pump to said fuel injection valve at an effectively constant level.

2. A diesel engine as defined in claim 1, wherein said exhaust gas recirculating device includes an exhaust gas recirculating passage connecting the air intake passage and the exhaust gas passage, an exhaust gas recirculation control valve inserted in this exhaust gas recirculating passage, an air intake throttle valve situated upstream of the confluence of the air intake passage and exhaust gas recirculating passage, and a control unit which opens and closes these valves according to the running condition of the engine.

3. A diesel engine as defined in claim 2, wherein said exhaust gas recirculation control valve and said air intake throttle valve are driven by negative pressure actuators.

4. A diesel engine as defined in claim 3, wherein said negative pressure actuators are driven by a negative pressure adjusted by a negative pressure valve controlled by the control unit, and wherein said exhaust gas recirculation control valve is opened and said air intake valve is throttled at least when the engine is running on partial load.

5. A diesel engine as defined in claim 1, wherein air intake valves and exhaust valves are fitted to said cylinder head such that they are parallel to the cylinder axis, and said fuel injection valve is situated between these air intake valves and exhaust valves.

6. A diesel engine as defined in claim 1, wherein said fuel injection valve includes an injection nozzle, a needle valve situated inside said injection nozzle, a first spring which acts on said needle valve in such a direction as to close it, a spring seat which adjusts the initial lift of the needle valve, and a second spring which acts on this spring seat in such a direction as to close the needle valve.

7. A diesel engine as defined in claim 6, wherein said spring seat is set to adjust the initial lift of the needle valve to about 10–40 μm.

8. A diesel engine as defined in claim 6, wherein said injection nozzle has a seat to support said needle valve and said seat is provided with a plurality of spray holes of substantially equal area which are disposed radially around the nozzle axis, spaced at equal intervals apart and inclined at equal angles to the nozzle axis.

9. A diesel engine as defined in claim 6, wherein a guide is provided on the needle valve which guides the valve concentrically with respect to said injection nozzle.

10. A diesel engine as defined in claim 1, wherein said fuel injection pump includes a delivery valve which prevents fuel flowing back from said pipe and which leads high pressure fuel to said fuel injection valve, said pressure equalizing valve being arranged in parallel to this delivery valve.

11. A diesel engine as defined in claim 10, wherein said pressure equalizing valve includes a spring to support it in a closed position, and which opens when the residual pressure in said pipe is above a set pressure of said spring after injection of fuel, and which sucks fuel back to said fuel injection pump.

12. A diesel engine as defined in claim 11, wherein said set pressure of said spring is set below an initial injection pressure of said fuel injection valve.

13. A diesel engine having a combustion chamber formed by a cylinder and a piston and into which fuel is directly injected comprising:

a device for recirculating at least a part of the exhaust gas into the air intake depending on the operating condition of the engine, a fuel injection valve fitted to a cylinder head of said cylinder substantially parallel to or coaxial with the cylinder axis and facing the center of said combustion chamber, said injection valve lifting in two stages, depending on the fuel pressure, to inject fuel into the chamber, a fuel injection pump which supplies high pressure fuel to said fuel injection valve in synchronization with the engine, said fuel injection pump having a plunger driven by a cam in synchronization with the engine revolution for pressurizing fuel, a control sleeve sliding on an outer surface of said plunger along the axis of said plunger to advance or delay the time at which fuel is supplied to the engine and a sleeve drive cam to drive said control sleeve relative to said plunger so as to advance the time at which fuel begins to be supplied and decrease the fuel supply rate when the engine is running on full load, and a pressure equalizing valve which maintains the residual fuel pressure in a pipe which leads fuel from said pump to said fuel injection valve at an effectively constant level.

14. A diesel engine as defined in claim 13, wherein said exhaust gas recirculating device comprises an exhaust gas recirculating passage connecting the air intake passage and the exhaust gas passage, an exhaust gas recirculation control valve inserted in said exhaust gas recirculating passage, an air intake throttle valve situated upstream of the confluence of the air intake passage and exhaust gas recirculating passage, and a control unit which opens and closes these valves according to the operating condition of the engine.

15. A diesel engine as defined in claim 14, wherein said exhaust gas recirculation control valve and said air intake throttle valve are driven by negative pressure actuators.

16. A diesel engine as defined in claim 15, wherein said negative pressure actuators are driven by a negative pressure adjusted by a negative pressure valve controlled by said control unit, and wherein said exhaust gas recirculation control valve is opened and said air intake valve is throttled at least when the engine is running on partial load.

17. A diesel engine as defined in claim 13, wherein air intake valves and exhaust valves are fitted to said cylinder head such that they are parallel to the cylinder axis, and said fuel injection valve is situated between these air intake valves and exhaust valves.

18. A diesel engine as defined in claim 13, wherein said fuel injection valve is provided with an injection nozzle, a needle valve situated inside said injection nozzle, a first spring which acts on this needle valve to close it, a spring seat which adjusts the initial lift of the needle valve, and a second spring which acts on said spring seat to close the needle valve.

19. A diesel engine as defined in claim 18, wherein said spring seat is set to adjust the initial lift of the needle valve to about 10–40$\mu$m.

20. A diesel engine as defined in claim 18, wherein said injection nozzle has a seat to support said needle valve and said seat is provided with a plurality of spray holes of substantially equal area which are disposed radially around the nozzle axis, spaced at equal intervals apart and inclined at equal angles to the nozzle axis.

21. A diesel engine as defined in claim 18, wherein a guide is provided on the needle valve which guides the valve concentrically with respect to said injection nozzle.

22. A diesel engine as defined in claim 13, wherein said fuel injection pump includes a delivery valve which prevents fuel flowing back from said pipe and which leads high pressure fuel to said fuel injection valve, said pressure equalizing valve being arranged in parallel to said delivery valve.

23. A diesel engine as defined in claim 22, wherein said pressure equalizing valve includes a spring to support it in a close position, opens when the residual pressure in said pipe is above a set pressure of said spring after injection of fuel, and sucks fuel back to said fuel injection pump.

24. A diesel engine as defined in claim 23, wherein said set pressure of said spring is set below the initial injection pressure of said fuel injection valve.

* * * * *